May 5, 1970  D. E. LUPFER  3,509,729
HYDRATE DETECTION AND CONTROL IN FRACTIONATION COLUMNS
Filed Dec. 29, 1967  2 Sheets-Sheet 1

INVENTOR.
D. E. LUPFER
BY Young & Quigg
ATTORNEYS

May 5, 1970        D. E. LUPFER        3,509,729

HYDRATE DETECTION AND CONTROL IN FRACTIONATION COLUMNS

Filed Dec. 29, 1967        2 Sheets-Sheet 2

INVENTOR.
D. E. LUPFER
BY Young & Quigg
ATTORNEYS

United States Patent Office 3,509,729
Patented May 5, 1970

3,509,729
HYDRATE DETECTION AND CONTROL IN
FRACTIONATION COLUMNS
Dale E. Lupfer, Bartlesville, Okla., assignor to Phillips
Petroleum Company, a corporation of Delaware
Filed Dec. 29, 1967, Ser. No. 694,598
Int. Cl. F25j 3/02
U.S. Cl. 62—37                                6 Claims

ABSTRACT OF THE DISCLOSURE

Hydrate formation in fractionation columns is detected by measuring feed and kettle product flow rates and the pressure differential across the column. In response to these measurements, hydrate formation is calculated by comparing changes in differential pressure and kettle product flow. A hydrate inhibitor is then added to the column to eliminate hydrates.

---

This invention relates to the detection of hydrates in fractionation columns and to the elimination of hydrates from fractionation columns.

Hydrate formation is often a serious problem in the processing of gases at low temperatures. In order to avoid hydrate formation, dryers are employed to remove as much water as possible. However, dryers are not always entirely successful because water can enter streams from leaks in heat exchangers and other sources. Also, the dryers may become saturated. The presence of hydrates in fractionation columns can be a particularly serious problem if the hydrates occur in sufficient volume to plug the column.

In accordance with the present invention, a system is provided for detecting the presence of hydrates in fractionation columns and for removing the hydrates. This hydrate detection system is based on the measurement of two separate process conditions in the column, each of which can be indicative of hydrate formation. The first of these conditions is the pressure drop across the column. An increase in pressure drop can be indicative of hydrate formation. The second condition is a decrease in flow of kettle product from the column, which can result from hydrate plugging of the column. The decrease in flow of kettle product is computed from measurements of the feed flow rate and the kettle product withdrawal rate. When both the pressure drop and the decreased flow of kettle product exceed predetermined values, a signal is established which is indicative of the presence of hydrates in the column. This signal can be used to sound an alarm or to initiate appropriate action to eliminate the hydrates. For example, a hydrate inhibitor such as alcohol can be added to the column.

Accordingly, it is an object of this invention to provide a system for detecting the presence of hydrates in a fractionation column.

Another object is to provide apparatus for controlling the operation of fractionation columns to eliminate hydrates.

Figure 1:
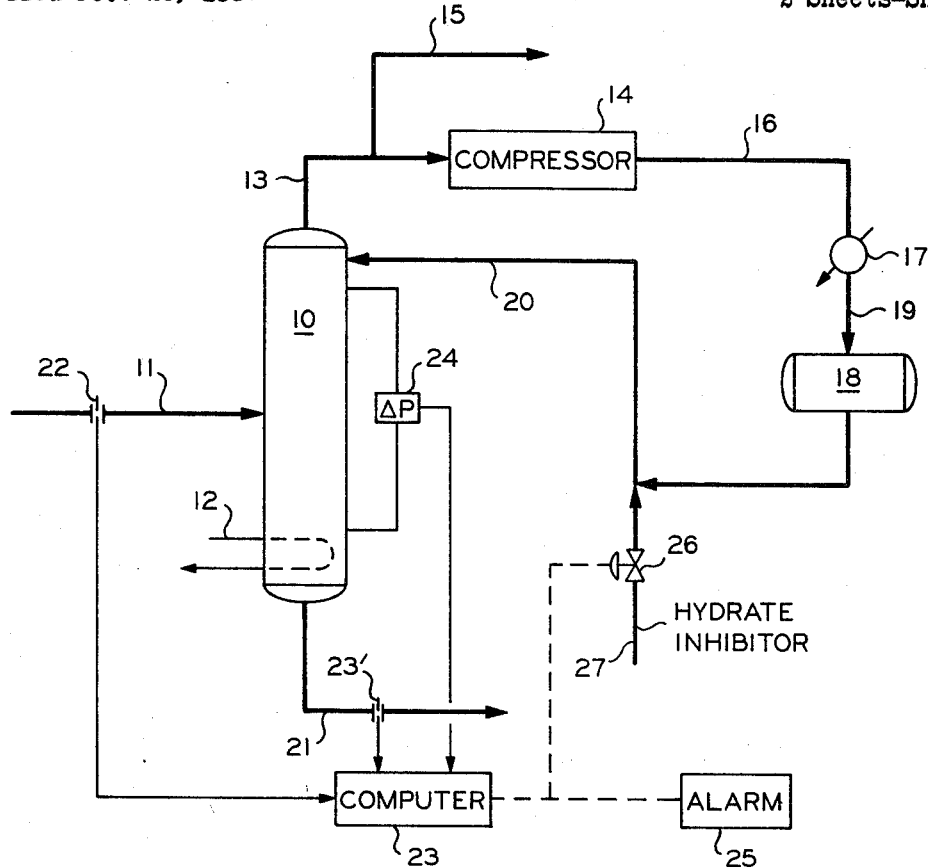
Figure 2:
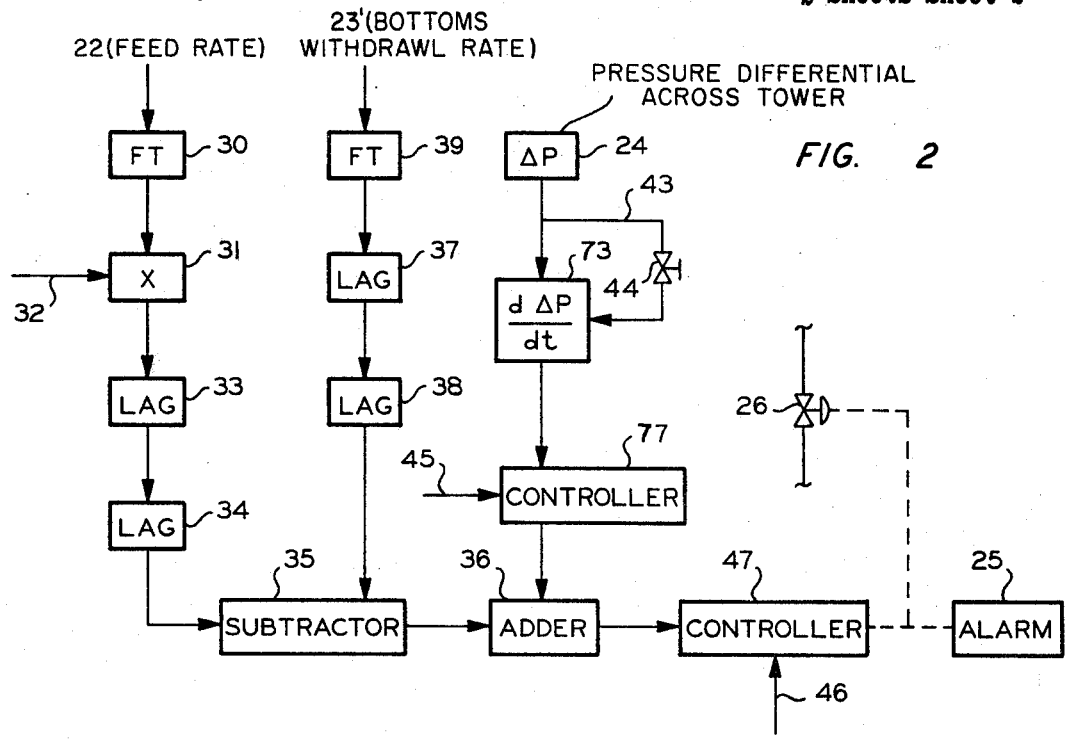
Figure 3:
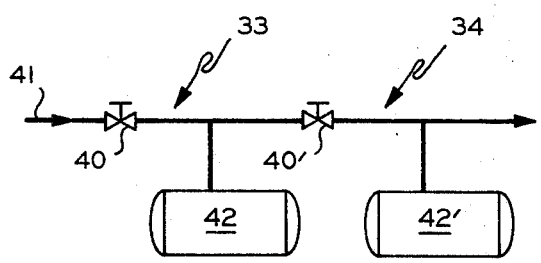
Figure 4:
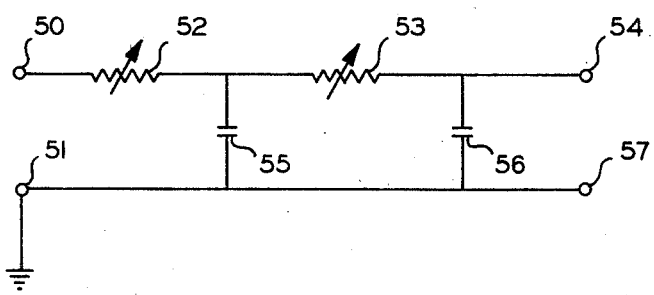

Other objects, advantages and features of the invention should become apparent from the following detailed description, taken in conjunction with the accompanying drawing in which:

FIG. 1 is a schematic representation of a fractionation system having the hydrate detector and control system of this invention incorporated therein. FIG. 2 is a schematic view of the computer employed in the detection and control system of FIG. 1. FIG. 3 is a schematic view of a pneumatic lag which can be employed in the computer of FIG. 2. FIG. 4 is a schematic view of an electrical lag which can be employed in the computer of FIG. 2.

Figure 5:
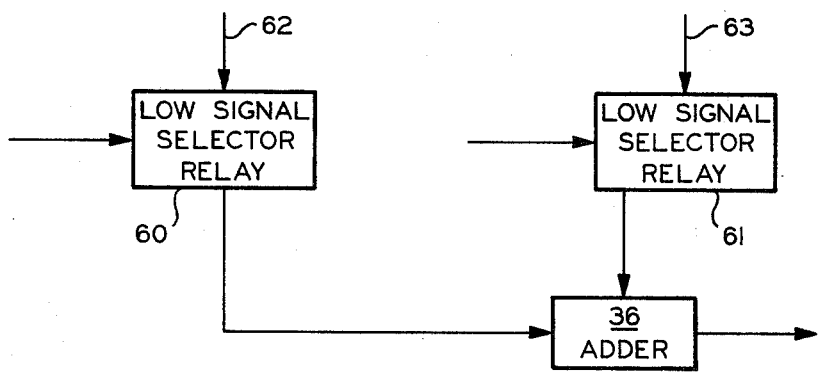

FIG. 5 is a schematic view of a modification of a portion of the computer of FIG. 2.

Referring now to the drawing in detail and to FIG. 1 in particular, there is shown a fractionation column 10 which is adapted to be operated at low temperatures to separate fluid mixtures. For example, such a column can be employed to remove ethane from ethylene to provide a high purity ethylene stream. A fluid mixture to be separated is introduced into column 10 through a conduit 11. Heat is supplied to the lower region of column 10 by means of a suitable heating means 12. A gaseous stream is removed from the top of column 10 through a conduit 13 which communicates with the inlet of a compressor 14. An outlet conduit 15 communicates with conduit 13 to remove an overhead gaseous product, which can be a high purity ethylene stream in the example mentioned above. A conduit 16 communicates between the outlet of compressor 14 and a condenser 17. The condensed gases are cooled and condensed by condenser 17 to provide a liquid reflux stream which is introduced into an accumulator 18 by means of a conduit 19. Reflux is returned to column 10 from accumulator 18 through a conduit 20. A conduit 21 communicates with the bottom of column 10 to remove a kettle product stream, which is primarily ethane in the above example.

Flow transducers 22 and 23' are positioned in respective conduits 11 and 21 to establish signals representative of the flow rates through the two conduits. These signals are applied to a computer 23 which is described in detail hereinafter. A transducer 24 establishes an output signal which is representative of the pressure drop across column 10. This signal is also applied to the input of computer 23. As will be described in detail hereinafter, computer 23 establishes an output signal which is representative of the formation of hydrates in column 10. This signal can actuate an alarm 25 to alert an operator that appropriate corrective action should be taken. This output signal can also be employed to control the introduction of an hydrate inhibitor, such as methyl alcohol, into column 10. To this end, an output control signal from computer 23 can be employed to open a valve 26 in a conduit 27 which communicates with reflux conduit 20. Opening of valve 26 permits passage of hydrate inhibitor into the column through conduit 20.

A first embodiment of computer 23 is illustrated schematically in FIG. 2. The signal from flow transducer 22 is applied to a flow transmitter 30 which establishes an output signal that is representative of the rate of flow through conduit 11. This signal is applied to the input of a multiplier 31. The second input to multiplier 31 is a constant signal 32. The output signal from multiplier 31 is transmitted through two lag devices 33 and 34 to the first input of a subtractor 35. A second flow transmitter 39 receives the signal from transducer 23' and establishes an output signal which is representative of the rate of flow of fluid through conduit 21. This signal is transmitted through lag devices 37 and 38 to the second input of subtractor 35. The output of subtractor 35 is applied to the first input of an adder 36. The signal from differential pressure transducer 24 is applied to the input of a derivative element 73 which establishes an output signal that is representative of the derivative of the pressure differential with respect to time. This signal is applied to the input of a controller 77, the output of which is applied to the second input of adder 36. The output of adder 36 is applied to the input of a controller 47. The output signal from controller 47 actuates alarm 25 and/or controls the opening of valve 26.

The output signal from subtractor 35 is representative of the difference between the rates of flow through conduits 11 and 21. Fractionation column 10 is normally operated such that a predetermined fraction of the feed is withdrawn as kettle product. The constant value applied as input 32 to multiplier 31 is a fraction and is selected such that the two input signals to subtractor 35 normally are the same when the column is operating to make the desired separation. Lagging devices 33 and 34 are employed to compensate for the time lag between the flow of a given volume of fluid mixture into the column and the subsequent withdrawal of the heavy constituent thereof through conduit 21. These lags are adjusted in accordance with the operating conditions of the column. Lags 37 and 38 are employed primarily as smoothing devices to compensate for temporary fluctuations in flow. The actual time lag imparted by these two elements is small compared to the lag imparted by elements 33 and 34. As long as the column is operating smoothly, the two input signals to subtractor 35 are substantially equal such that there is a zero output signal to adder 36. However, the formation of hydrates in the column tends to plug the column and restrict the flow of kettle product and reduce the signal from transducer 23'. This results in a positive output signal being applied to adder 36 from subtractor 35.

The second input to adder 36 is also indicative of hydrate formation. As long as the column is operating smoothly, a substantially constant pressure differential is detected by transducer 24, such that a zero signal is applied to the second input of adder 36. However, any abrupt increase in differential pressure, which will occur if hydrates form in the column, results in a second signal being applied to adder 36 from derivative element 73. The computer elements are adjusted such that an output signal is established by adder 36 whenever there is both a rapid increase in pressure and a decrease in kettle product flow with respect to the feed. Neither signal alone will operate to establish an output signal from adder 36.

An important feature of this invention resides in the fact that two hydrate indicative conditions must occur simultaneously in order for the control system to be actuated. A decrease in rate of flow of kettle product could be indicative of changes in operating conditions other than hydrate formation. For example, an increase in feed stream purity could result in the flow of a greater quantity of gases overhead and a relatively smaller flow through conduit 21. Similarly, a change in differential pressure across the column could be indicative of changes in operating conditions other than hydrate formation. For example, a change in differential pressure could result from a change in feed or reflux rate or unsteady operation in the compressor and reflux system. However, the simultaneous occurrence of both detected conditions is strongly indicative of hydrate formation.

The computer of FIG. 2 can be formed of various types of elements. For example, both pneumatic and electrical equipment is available commercially for performing the indicated operations. As an alternative, the detected signals can be converted to digital form and the computations made by a digital computer.

In one specific embodiment, pneumatic control elements can be utilized. In such a system, flow transmitter 30 provides an output pneumatic pressure which is representative of the rate of flow through conduit 11. Element 31 can be a pneumatic multiplier or merely an adjustable gain on flow transmitter 30. Lagging devices 33 and 34 can be of the configuration illustrated in FIGURE 3. Lag 33 is provided by a valve 40 in a conduit 41 and a storage vessel 42 in communication with conduit 41 downstream from valve 40. Similarly, lag 34 is provided by a valve 40' and a storage vessel 42'. The valves and storage vessel thus perform an integration and delay function. Lags 37 and 38 can be of similar form except that they are adjusted to provide a much shorter lag time. Subtractor 35 and adder 36 can be conventional adding relay such as described in Technical Information Bulletin 37-A-57A, Foxboro Company, Foxboro, Mass., Sept. 12, 1956. A relay of this type provides an output signal which is representative of the following equation:

$$\text{Output} = G(A-C) + B$$

where G is the gain and A, B and C are the respective inputs. If such a relay is employed as subtractor 35, the output from lag 34 constitutes input A and the output from lag 38 constitutes input C. Input B is not used. The adding relay is adjusted to provide high gain in this application. If such a relay is employed as adder 36, the output from subtractor 35 constitutes input A, the gain value G is set at unity, and the output from controller 77 constitutes input B. Input C is not used. Similarly, elements 73, 77 and 47 can also be adding relays of the same type. In this operation, the output from transmitter 24 is applied to the A input of element 73. The same signal is applied through a conduit 43, which has an adjustable valve 44 therein, to the C input of the relay. The output of element 73 constitutes the A input to controller 77, where as a set point signal 45 constitutes the C input. The output from controller 77 constitutes the B input to adder 36, and the output form subtractor 35 constitutes the A input. When adding relays are employed in this manner, elements 73 and 77 are adjusted to have medium gain and element 36 is set to have a gain of unity. Controller 47 can also be an adding relay adjusted to have high gain and a set point 46.

If the components of FIG. 2 are electrical in nature, the lag elements can be of a configuration such as shown in FIGURE 4. Such a device is provided with two input terminals 50 and 51, the latter being grounded. Variable resistors 52 and 53, and a second capacitor 56 is connected 50 and a first output terminal 54. A first capacitor 55 is connected between terminal 51 and the junction between resistors 52 and 53, and a second capacitor 56 is connected between terminal 51 and terminal 54. The second input terminal 57 is also connected to ground. This circuit provides integration and delay.

A modified form of the apparatus of FIGURE 2 is illustrated schematically in FIGURE 5. This modification is provided with two low signal selector relays 60 and 61, the outputs of which are applied as the two inputs to an adder 36. Low signal selector relay 60 is positioned between subtractor 35 and adder 36 of FIGURE 2, and low signal selector relay 61 is positioned between controller 77 and adder 36. In such an operation, the selector relays are provided with respective reference input signal 62 and 63 which are less than the normal operating pressure applied to the various control elements. For example, if air under 15 pounds pressure is normally employed as the operating pressure in the pneumatic elements of FIGURE 2, a signal of the order of 10 pounds can be applied as reference signals 62 and 63. When operated in this manner, operating pressures of 10 pounds are also applied to elements 35 and 77 of FIGURE 2. The use of pressures of this order of magnitude provide more positive on-off control of the elements such that the output responds only to an output signal from adder 36 which is representative of both input signals exceeding preselected values.

While this invention has been described in conjunction with presently preferred embodiments, it should be evident that it is not limited thereto.

What is claimed is:

1. In a system for separating fluid mixtures by means of a fractionation column; apparatus to detect hydrate formation in the column comprising:

means to measure the rate of flow of feed mixture to the column and to establish a first signal representative thereof;

means responsive to said first signal to establish a second signal which is representative to said first signal delayed by a predetermined time and multiplied by a predetermined fraction;

means to measure the rate of flow of kettle product from the column and to establish a third signal representative thereof;

means to subtract said third signal from said second signal and to establish a fourth signal which is representative of the difference therebetween;

means to measure the pressure differential across said column and to establish a fifth signal representative thereof;

means responsive to said fifth signal to establish a sixth signal which is representative of the derivative of said fifth signal with respect to time;

means to compare said fourth and sixth signals and to establish an output signal when both signals are present and the sum of said fourth and sixth signals exceeds a predetermined value, said output signal being representative of hydrate formation in said fractionation column.

2. The apparatus of claim 1, further comprising means responsive to said output signal to introduce a hydrate inhibitor into said fractionation column.

3. The apparatus of claim 2 wherein said means to introduce inhibitor comprises means to introduce the inhibitor into the reflux stream of the fractional column.

4. The apparatus of claim 1, further comprising an alarm, and means responsive to said output signal to actuate said alarm.

5. The apparatus of claim 1 wherein said means to establish said first signal and said means to establish said fifth signal comprise means to establish pneumatic signals; said means to subtract and said means to compare comprise pneumatic adding relays; and said means to establish said sixth signal compresses a pneumatic relay, said fifth signal being applied to one input thereof, and flow restricting means to apply said fifth signal to the second input of the last mentioned pneumatic relay.

6. The apparatus of claim 5, further comprising a first low signal selector relay connected between said means to subtract and said means to compare, a second low signal selector relay connected between said means to establish said sixth signal and said means to compare, and means to apply reference pneumatic pressures to said selector relays.

References Cited

UNITED STATES PATENTS

| | | | |
|---|---|---|---|
| 2,985,565 | 5/1961 | Bellinger | 202—160 |
| 3,096,383 | 7/1963 | Hann. | |
| 3,359,185 | 12/1967 | Matta | 202—160 |
| 3,361,646 | 1/1968 | MacMullan | 62—23 |
| 3,401,092 | 10/1968 | Matta | 202—160 |
| 3,428,528 | 2/1969 | Oglesby | 203—2 |

OTHER REFERENCES

L. B. Phillips, How They Control Superfractionation, Hydrocarbon Processing and Petrol. Refiner, vol 42, No. 6, June 1963, pp. 159–160.

NORMAN YUDKOFF, Primary Examiner

A. PURCELL, Assistant Examiner

U.S. Cl. X.R.

55—82; 62—20; 202—160; 203—2; 235—151.12

UNITED STATES PATENT OFFICE

CERTIFICATE OF CORRECTION

Patent No. 3,509,729          Dale E. Lupfer          Dated May 5, 1970

It is certified that error appears in the above-identified patent and that said Letters Patent are hereby corrected as shown below:

Column 4, line 73, "to" should be --- of --- .

Column 5, line 24, "fractional" should be --- fractionation --- .

Column 6, line 1, "compresses" should be --- comprises --- .

SIGNED AND SEALED

SEP 29 1970

(SEAL)
Attest:

Edward M. Fletcher, Jr.
Attesting Officer

WILLIAM E. SCHUYLER, JR.
Commissioner of Patents